(12) United States Patent
Lee et al.

(10) Patent No.: US 11,972,888 B2
(45) Date of Patent: Apr. 30, 2024

(54) VARIABLE VOLTAGE INDUCTOR WITH DIRECT LIQUID COOLING

(71) Applicant: FORD GLOBAL TECHNOLOGIES, LLC, Dearborn, MI (US)

(72) Inventors: Moon Young Lee, Livonia, MI (US); Baoming Ge, Okemos, MI (US); Fan Wang, Novi, MI (US); Lihua Chen, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 612 days.

(21) Appl. No.: 16/952,067

(22) Filed: Nov. 18, 2020

(65) Prior Publication Data

US 2022/0157507 A1    May 19, 2022

(51) Int. Cl.
*H01F 27/32* (2006.01)
*B60K 6/40* (2007.10)
*H01F 21/12* (2006.01)
*H01F 27/12* (2006.01)
*H02K 9/00* (2006.01)

(52) U.S. Cl.
CPC .............. *H01F 21/12* (2013.01); *B60K 6/40* (2013.01); *H01F 27/12* (2013.01); *H01F 27/322* (2013.01); *H02K 9/00* (2013.01)

(58) Field of Classification Search
CPC .......... H01F 21/12; H01F 27/12; H01F 37/00; H01F 27/2876; H01F 27/306; B60K 6/40; B60K 11/02; B60K 2006/4808; B60K 6/28; H02K 9/00
See application file for complete search history.

(56) References Cited

U.S. PATENT DOCUMENTS

| | | |
|---|---|---|
| 9,581,243 B2 | 2/2017 | Sung et al. |
| 10,460,865 B2 | 10/2019 | Zarei et al. |
| 2014/0175867 A1* | 6/2014 | Sung ................... F16H 57/0412 307/9.1 |
| 2017/0084375 A1 | 3/2017 | Vafakhah et al. |

* cited by examiner

*Primary Examiner* — Tuyen T Nguyen
(74) *Attorney, Agent, or Firm* — David B. Kelley; Brooks Kushman P.C.

(57) ABSTRACT

An inductor for a converter of an electric machine includes a core defining a channel configured to receive transmission fluid on an outer surface of the core. Coils made of windings are wrapped on the core. The windings enclose an open side of the channel to define an oil flow passage, wherein oil flowing through the oil flow passage is in direct contact with both the windings and the core to absorb heat from the windings and the core.

11 Claims, 3 Drawing Sheets

VARIABLE VOLTAGE INDUCTOR WITH DIRECT LIQUID COOLING

TECHNICAL FIELD

This disclosure relates to cooling an inductor for an electric machine of an electric vehicle.

BACKGROUND

A power inductor for a variable voltage converter (VVC) in a hybrid electric vehicle (HEV) includes a core that is wrapped tightly with copper coils that hide the core. Uncovered portions of the coil that are not wrapped by the coils are covered by end caps.

Certain cooling systems for inductors focus on cooling the exposed coils, for example, through an adjacent cold plate, a thermal pad, thermal grease, or by splashing oil onto coils of the inductor. The core is the hottest spot inside inductor. Heat in the core is slowly dissipated through highly heated coils. In some driving conditions, when a high boost voltage is needed, the core is substantially hotter than the coils.

The use of Silicon Carbide (SiC) MOSFET circuits in future applications is expected to increase both the switching frequency and maximum boost voltage. A change to Silicon Carbide (SiC) MOSFET circuits is expected to result in higher temperatures and increased core energy losses.

SUMMARY

There is a need to develop an effective way to simultaneously cool down the inductor core and coil of an electric machine of hybrid electric vehicles and other types of electric vehicles. The embodiments of this disclosure provide a solution to directly cool both core and coils, so that the hottest spot inside inductor can be cooled with transmission fluid circulated to directly contact the core of the inductor.

According to one aspect of this disclosure, an inductor for a converter is disclosed for an electric machine of an electric vehicle. The inductor includes a core defining a channel configured to receive oil on an outer surface of the core, and windings wrapped on the core. The windings enclose an open side of the channel to define an oil flow passage, wherein oil flowing through the oil flow passage is in direct contact with both the windings and the core to absorb heat from the windings and the core.

According to other aspects of this disclosure as it relates to the inductor that may be attached to a support board, the inductor includes an inlet that defines a first opening being configured to supply oil to the channel from an oil circulation system and an outlet that defines a second opening being configured to expel oil from the channel.

Oil from the outlet may be directed to a conduit of the oil circulation system. The oil circulation system may provide oil under pressure to the inlet. The channel may be a first channel and the converter may further comprise a second channel configured to receive oil on an outer surface, wherein the windings encloses a second open side of the second channel to define a second oil flow passage, wherein oil flowing through the second oil flow passage is in direct contact with both the windings and the core at a location on the core spaced from the first channel to absorb heat from the windings and the core.

The first channel may be defined on a first surface of the core and the second channel may be defined on a second surface of the core. The first surface and the second surface are oriented to face in opposite directions.

The inductor may further comprise a core and windings that are assembled to a supporting structure. The end cap may include an inlet that defines a first opening configured to supply oil to the channel from an oil circulation system, and an outlet defined by the core and windings may be configured to expel oil from the channel. Oil from the channel may be expelled to drain into an oil reservoir.

An outer surface of the windings may be oriented to have oil splashed onto an outer surface of the windings to cool the windings.

According to another aspect of this disclosure, an electric machine for an electric vehicle is disclosed. The electric machine may comprise a variable voltage converter with an inductor including a core defining a channel configured to receive oil on an outer surface. One or more coils are made up of windings wrapped on the core. The coils enclose an open side of the channel to define an oil flow passage. Oil flowing through the oil flow passage directly contacts both the coil and the core to absorb heat. The coil and the core are assembled to a support board or other support structure. An inlet defines a first opening configured to supply oil to the channel from an oil circulation system and an outlet that defines a second opening configured to expel oil from the channel to a conduit of the oil circulation system.

A further aspect of this disclosure is to provide an electric machine for an electric vehicle comprising a variable voltage converter including an inductor. The inductor includes a core defining a channel. The channel receives oil on an outer surface. A coil is wrapped on the core and encloses an open side of the channel to define an oil flow passage. Oil flowing through the oil flow passage is in direct contact with both the coil and the core to absorb heat from the coil and the core. An end cap may include an inlet defining a first opening that is configured to supply oil to the channel from an oil circulation system. An outlet is defined by the core and windings and is configured to expel oil from the channel.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Figure 1:
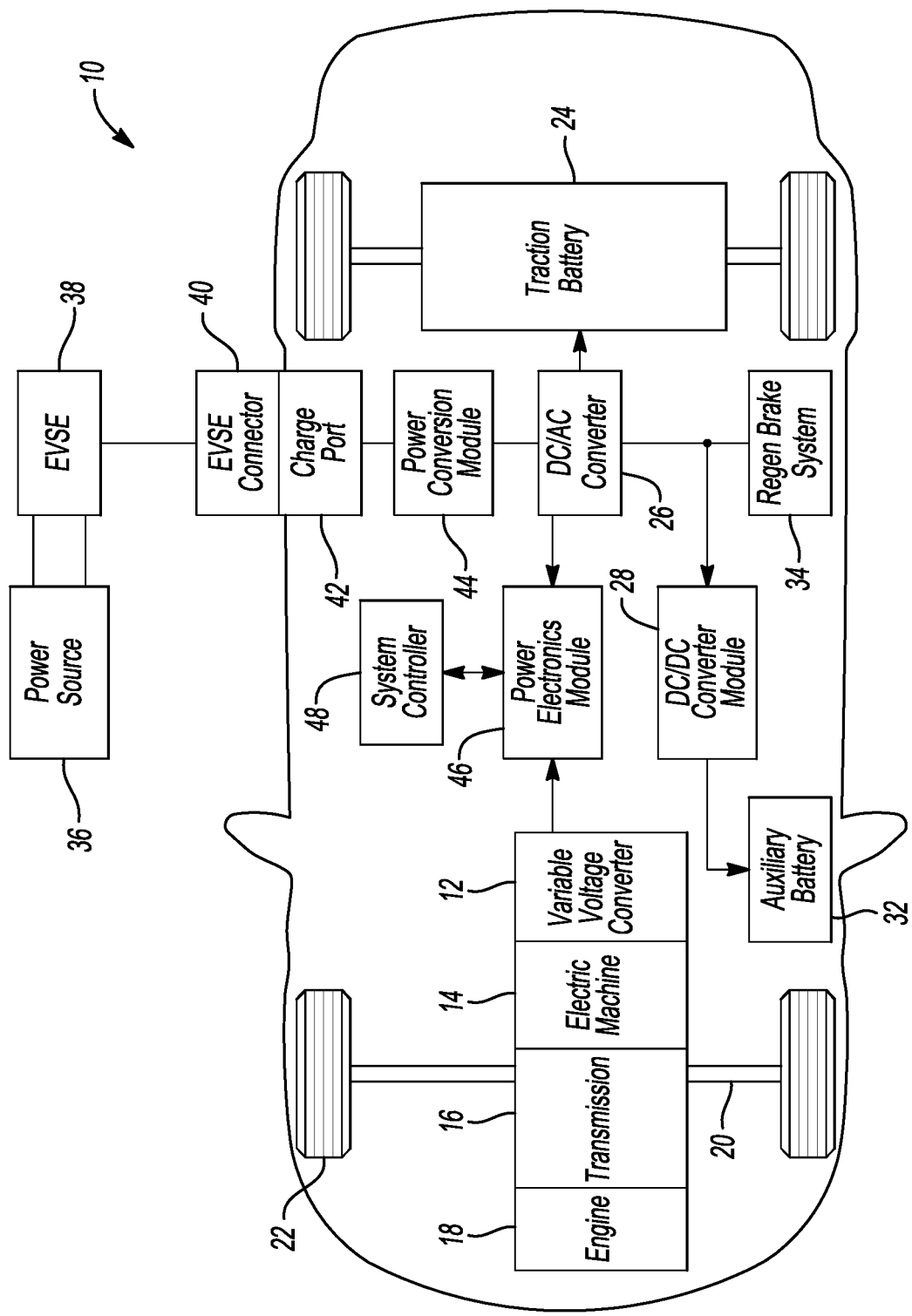
FIG. 1 is a diagrammatic view of an electric vehicle including an electric machine for propelling the vehicle and storing power from a regenerative braking system.

Referring to FIG. 1, a schematic diagram is provided that illustrates an example of an electrified vehicle 10. In this example, the electrified vehicle is a plug-in electric vehicle 10, however, the variable voltage converter 12 disclosed herein is not limited to such vehicles and may be used on other types of electric vehicles. The vehicle 10 may include one or more electric machines 14 mechanically connected to a transmission 16. The electric machine 14 may be capable of operating as a motor or a generator. The hybrid transmission 16 is mechanically connected to an engine 18 and to a drive shaft 20 that is mechanically connected to wheels 22. The electric machine 14 propels the vehicle 10. The electric machine 14 may also operate as a generator that provides fuel economy benefits by recovering energy that would normally be lost as heat in the friction braking system. The electric machine 14 also provides reduced pollutant emissions since the vehicle 10 may be operated in a full electric mode.

A traction battery 24 stores energy that may be used by the electric machine 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 46 through a VVC that includes one or more inductors (shown in FIGS. 2-5). The inductors isolate the traction battery 24 from other components when open and connect the traction battery 24 to other components when closed.

The DC/AC inverter 26 is also electrically connected to the electric machine 14 and bi-directionally transfers electrical energy between the traction battery 24 and the electric machine 14. For example, a typical traction battery 24 provides a DC voltage while the electric machine 14 requires a three-phase AC voltage to function. The DC/AC inverter 26 may convert the DC voltage to a three-phase AC voltage as required by the electric machine 14. In a regenerative mode, the DC/AC inverter 26 may convert the three-phase AC voltage from the electric machine 14 acting as a generator to the DC voltage required by the traction battery 24. For a pure electric vehicle, the hybrid transmission 16 may be a gear box connected to an electric machine 14 and the engine 18 will not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with low voltage ("LV") loads. Other high-voltage loads, such as compressors and electric heaters, may be connected directly to the high-voltage without the use of a DC/DC converter module 28. The DC/DC power converter module may function as a boost converter capable of providing multiple levels of inductive output for either plug-in or hybrid electric vehicles. In a conventional internal combustion engine powered vehicle, low-voltage systems are electrically connected to an auxiliary battery 32 (e.g., a twelve-volt battery).

The vehicle 10 may be recharged by an external power source 36 such as a charger outlet. The external power source 36 may be electrically connected to electric vehicle supply equipment (EVSE) 38. The EVSE 38 may provide circuitry and controls to regulate and manage the transfer of electrical energy between the power source 36 and the vehicle 10. The external power source 36 may provide DC or AC electric power to the EVSE 38. The EVSE 38 may have an EVSE converter 40 for plugging into a charge port 42 of the vehicle 10. The charge port 42 may be any type of port configured to transfer power from the EVSE 38 to the vehicle 10. The charge port 42 may be electrically connected to a charger or on-board power conversion module 44. The power conversion module 44 may condition the power supplied from the EVSE 38 to provide the proper voltage and current levels to the traction battery 24. The power conversion module 44 interfaces with the EVSE 38 to coordinate the delivery of power to the vehicle 10. The power conversion module 44 converts the power provided to the power electronics module 46. The power electronics module 46 is, in turn, controlled by the system controller 48.

Figure 2:
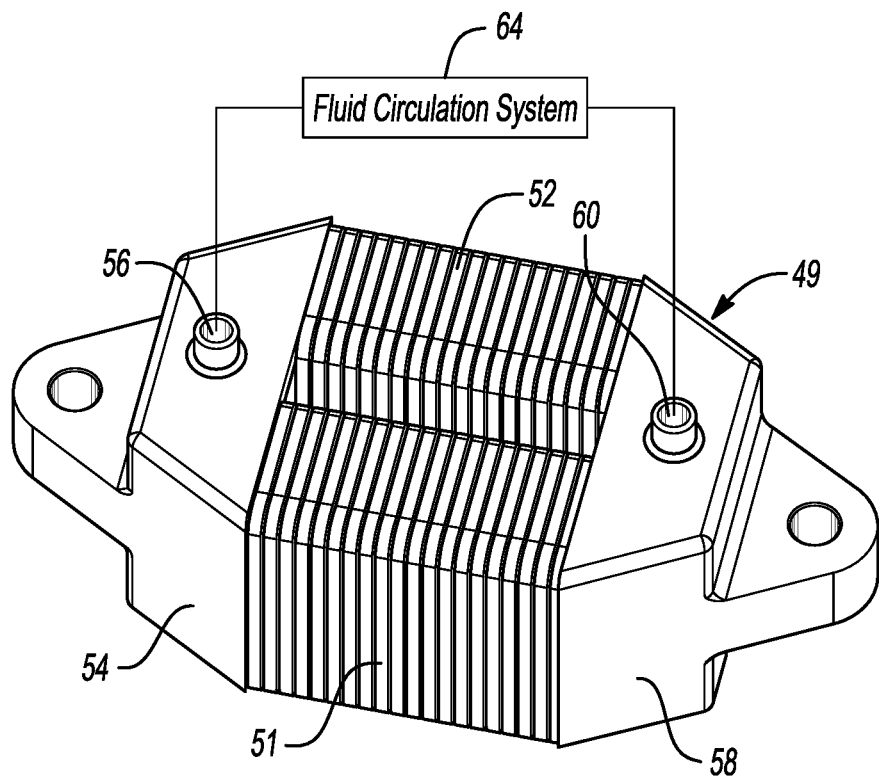
FIG. 2 is a perspective view of an inductor of a variable voltage converter made according to one aspect of this disclosure.
Figure 3:
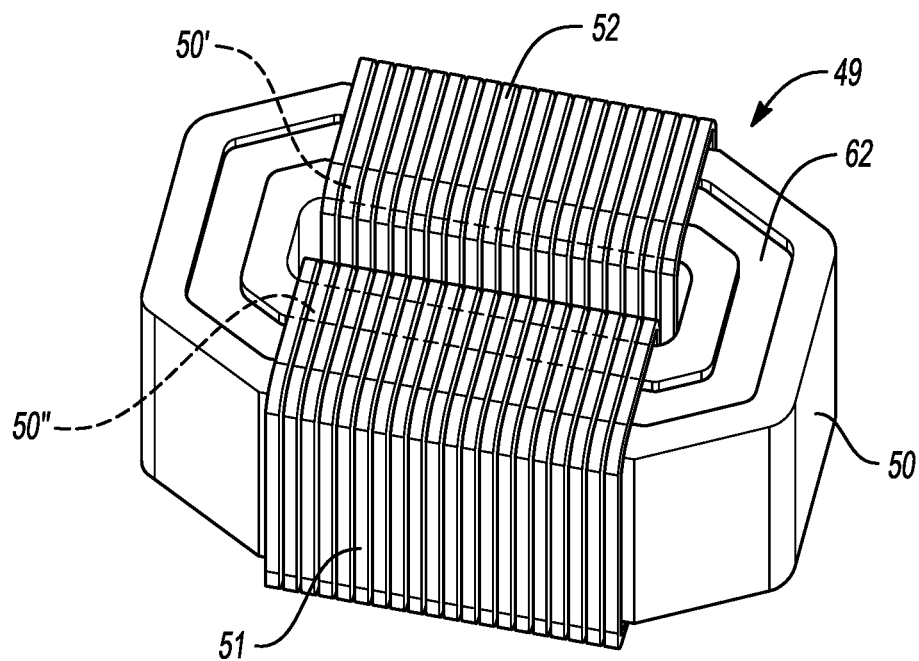
FIG. 3 is a perspective view of the inductor of FIG. 2 with the end caps removed from the core.

Referring to FIGS. 2 and 3, the variable voltage converter ("VVC") 12 (shown in FIG. 1) includes an inductor 49 comprising a core 50 wound by coils 51 and 52. The core 50 includes a first leg 50' and a second leg 50" that are wound by the coils 51 and 52. A first end cap 54 includes an inlet 56 and a second end cap 58 includes an outlet 60. A channel 62 is formed in the core 50. The coils 51 and 52 are wrapped around the core 50 and extend across the channel 62 to form enclosed spaces, or fluid passages.

A fluid (not shown), such as transmission fluid, is supplied to the inlet 56 and flows through the channel 62. The fluid flows in the channel 62 between the core 50 and the coil 52 to simultaneously cool both the core 50 and the coil 52. Fluid is drained from the channel 62 through the outlet 60 to a fluid circulation system 64, that is preferably part of the transmission fluid circulation system.

Figure 4:
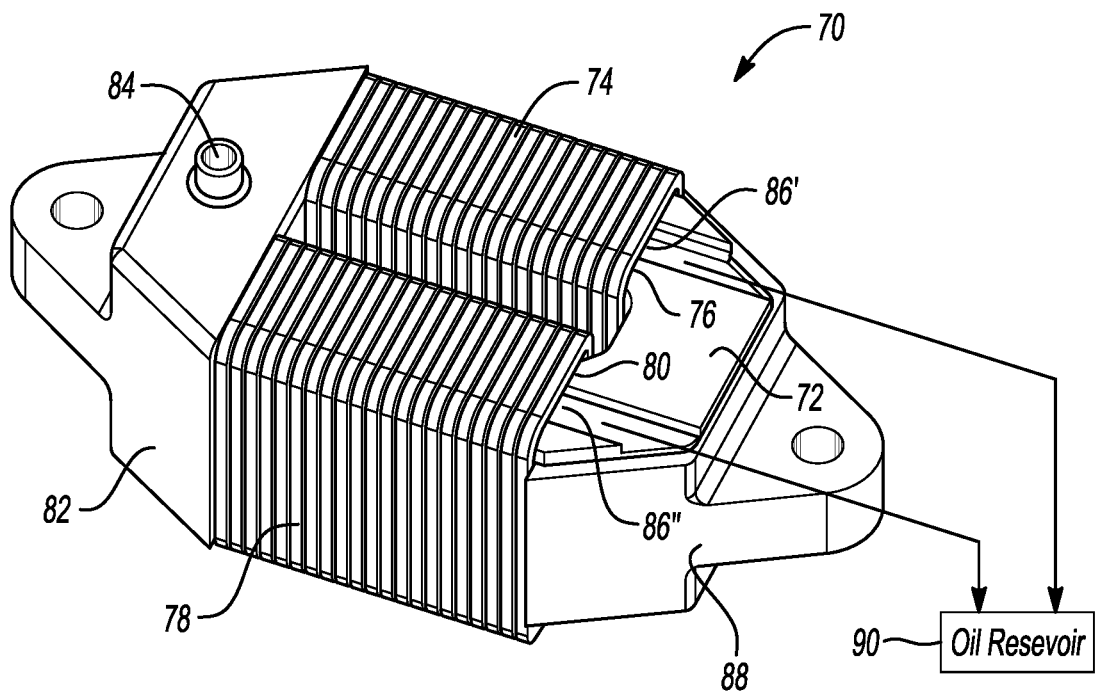
FIG. 4 is a perspective view of an inductor of a variable voltage converter made according to another aspect of this disclosure.
Figure 5:
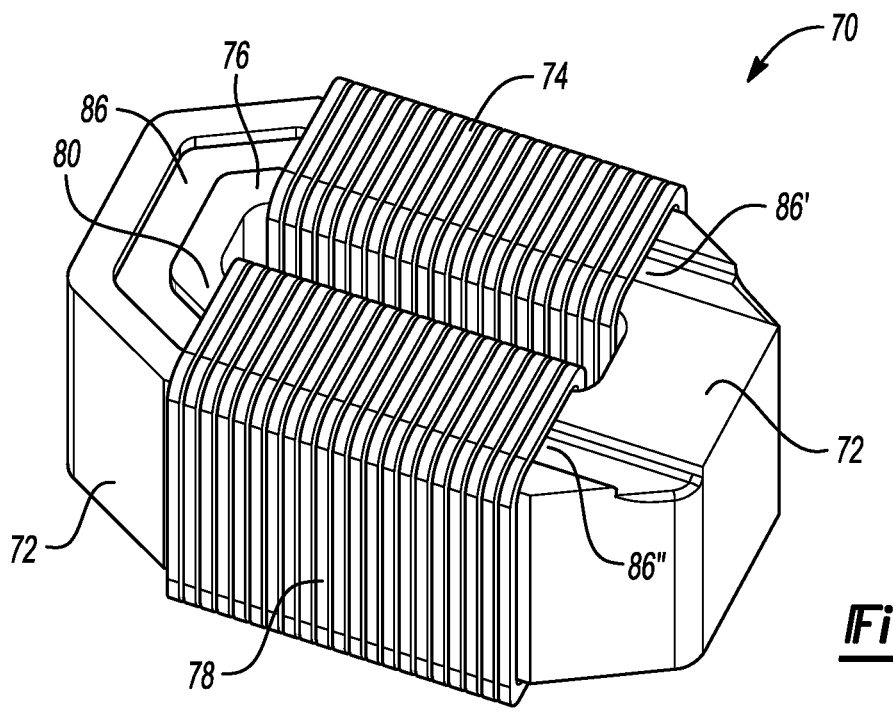
FIG. 5 is a perspective view of the inductor of FIG. 4 with the end cap removed from the core.

Referring to FIGS. 4 and 5, an alternative embodiment of an inductor 70 for a VVC 12 is illustrated that includes a core 72 and a first coil 74 wound around a first leg 76 of the core 72. A second coil 78 is wound around a second leg 80 of the core 72. An end cap 82 including a fluid inlet port 84 is provided on a first end of the core 72.

A channel 86 is formed in the core 72. Coils 74 and 78 are wrapped around the first leg 76 and second leg 80, respectively, and extend across the channel 86 to form enclosed passages 86' and 86". Transmission fluid is supplied to the inlet 84 and flows through the channel 86 and passages 86' and 86". Transmission fluid is in direct contact with and flows between the core 72 and the coil 74 in the 86' and 86" to simultaneously cool both the core 72 and the coil 74. Fluid is drained from the channel 86 on the opposite end 88 of the core from the end cap 82. The two passages 86' and 86" drain the fluid from the inductor 70 and into an oil reservoir 90 in the bottom of the transmission 16.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments.

What is claimed is:

1. An electric machine for an electric vehicle comprising:
   a variable voltage converter including an inductor including a core defining a channel configured to receive oil on an outer surface, and a coil wrapped on the core, the coil enclosing an open side of the channel to define an oil flow passage between the coil and the core, wherein oil flowing through the oil flow passage is in direct contact with both the coil and the core to absorb heat from the coil and the core, wherein the channel traverses the full length of the coil; and
   a first end cap including an inlet that defines a first opening configured to supply oil to the channel from an oil circulation system and a second endcap defining an outlet that defines a second opening configured to expel oil from the channel to a conduit of the oil circulation system.

2. The electric machine of claim 1 wherein the oil circulation system provides oil under pressure to the inlet.

3. The electric machine of claim 1 wherein the channel is a first channel, the electric machine comprising:
   a second channel configured to receive oil on an outer surface, wherein the coil encloses a second open side of the second channel to define a second oil flow passage, wherein oil flowing through the second oil flow passage is in direct contact with both the coil and the core at a location on the core spaced from the first channel to absorb heat from the coil and the core.

4. The electric machine of claim 3 wherein the first channel is defined on a first surface of the core and the second channel is defined on a second surface of the core.

5. The electric machine of claim 1 wherein an outer surface of the coil is oriented to have oil splashed onto an outer surface of the coil to cool the coil.

6. The electric machine of claim 5 wherein the oil circulation system provides oil under pressure to the inlet.

7. An electric machine for an electric vehicle comprising:
   a variable voltage converter including an inductor including a core defining a channel configured to receive oil on an outer surface, and a coil wrapped on the core, the coil enclosing an open side of the channel to define an oil flow passage between the core and the coil, wherein oil flowing through the oil flow passage is in direct contact with both the coil and the core to absorb heat from the coil and the core, wherein the channel traverses the full length of the coil;
   an end cap including an inlet that defines a first opening, the first opening being configured to supply oil to the channel from an oil circulation system; and
   an outlet defined by the core and the coil, the outlet being configured to expel oil from the channel.

8. The electric machine of claim 7 wherein the channel is a first channel, the electric machine comprising:
   a second channel configured to receive oil on an outer surface, wherein the coil encloses a second open side of the second channel to define a second oil flow passage, wherein oil flowing through the second oil flow passage is in direct contact with both the coil and the core at a location on the core spaced from the first channel to absorb heat from the coil and the core.

9. The electric machine of claim 8 wherein the first channel is defined on a first surface of the core and the second channel is defined on a second surface of the core, wherein the first surface and the second surface are spaced apart.

10. The electric machine of claim 7 wherein oil from the channel is expelled to drain into an oil reservoir.

11. The electric machine of claim 7 wherein the oil circulation system provides oil under pressure to the inlet.

* * * * *